(12) United States Patent
Soroush

(10) Patent No.: US 12,460,543 B2
(45) Date of Patent: Nov. 4, 2025

(54) DOWNHOLE FLAT-JACK IN-SITU STRESS TOOL (DFISS) FOR DIRECT IN-SITU STRESS MEASUREMENT IN DEEP WELLS

(71) Applicant: Hamed Soroush, Brookhaven, GA (US)

(72) Inventor: Hamed Soroush, Brookhaven, GA (US)

( * ) Notice: Subject to any disclaimer, the term of this patent is extended or adjusted under 35 U.S.C. 154(b) by 300 days.

(21) Appl. No.: 18/016,485

(22) PCT Filed: Jul. 30, 2021

(86) PCT No.: PCT/US2021/044000
§ 371 (c)(1),
(2) Date: Jan. 17, 2023

(87) PCT Pub. No.: WO2022/026889
PCT Pub. Date: Feb. 3, 2022

(65) Prior Publication Data
US 2023/0272712 A1    Aug. 31, 2023

Related U.S. Application Data

(60) Provisional application No. 63/059,273, filed on Jul. 31, 2020.

(51) Int. Cl.
*E21B 49/00*       (2006.01)
*G01L 1/00*        (2006.01)
(Continued)

(52) U.S. Cl.
CPC ............ *E21B 49/006* (2013.01); *E21B 49/00* (2013.01); *G01L 1/00* (2013.01); *G01L 1/02* (2013.01); *E21B 47/01* (2013.01)

(58) Field of Classification Search
CPC ......... E21B 49/00; E21B 49/006; G01L 1/00; G01L 1/02
See application file for complete search history.

(56) References Cited

U.S. PATENT DOCUMENTS 3,557,886 A * 1/1971 Cobbs .................. E21F 17/185
                                                            175/50
3,595,071 A * 7/1971 Da Rocha ................ G01N 3/12
                                                            73/84

(Continued)

FOREIGN PATENT DOCUMENTS

CA          2062542        9/1993
DE       44 30 074 C2      8/1994
(Continued)

OTHER PUBLICATIONS

Foreign Reference.*
(Continued)

*Primary Examiner* — Jill E Culler
(74) *Attorney, Agent, or Firm* — Bryan W. Bockhop; Bockhop Intellectual Property Law, LLC

(57) ABSTRACT

A tool (100) for measuring direct in-situ stress in rock (10) surrounding a borehole (12) includes: a slot cutting system (136), a flat-jack stress measurement device (134), a hydraulic system (124), and a sensor (514). The slot cutting system (136) cuts a slot (502) having an original width in the rock (10) surrounding the borehole (12). The flat-jack stress measurement device (134) fits into the slot (502). The hydraulic system (124) expands the flat jack stress measurement device (134) when it is in the slot to the original width of the slot (502). The sensor (514) measures pressure in the hydraulic system (124) when the flat-jack stress measurement device (134) has expanded to the original width of the slot (502).

21 Claims, 3 Drawing Sheets

(51) Int. Cl.
*G01L 1/02* (2006.01)
*E21B 47/01* (2012.01)

(56) References Cited

U.S. PATENT DOCUMENTS

| | | | | | |
|---|---|---|---|---|---|
| 4,149,409 | A | * | 4/1979 | Serata | E21B 49/006 |
| | | | | | 73/152.59 |
| 4,491,022 | A | * | 1/1985 | de la Cruz | E02D 1/022 |
| | | | | | 73/783 |
| 5,517,854 | A | * | 5/1996 | Plumb | E21B 49/008 |
| | | | | | 73/152.59 |

FOREIGN PATENT DOCUMENTS

| | | | |
|---|---|---|---|
| EP | 2 227 619 | B2 | 3/2015 |
| KR | 100918989 | B1 * | 9/2009 |

OTHER PUBLICATIONS

Fairhurst: "Stress estimation in rock: a brief history and review"; Jul. 20, 2003; International Journal of Rock Mechanics and Mining Sciences; pp. 957-973.

European Patent Office: "Supplementtary European Search Report"; Aug. 7, 2024; Search Report in related Euorpean Patent Application Serial No. 21850226.8.

* cited by examiner

DOWNHOLE FLAT-JACK IN-SITU STRESS TOOL (DFISS) FOR DIRECT IN-SITU STRESS MEASUREMENT IN DEEP WELLS

CROSS-REFERENCE TO RELATED APPLICATION(S)

This application claims the benefit of U.S. Provisional Patent Application Ser. No. 63/059,273, filed Jul. 31, 2020, the entirety of which is hereby incorporated herein by reference.

BACKGROUND OF THE INVENTION

1. Field of the Invention

The present invention relates to borehole rock property sensing systems and, more specifically, to a tool for measuring direct in-situ stress in rock surrounding a borehole.

2. Description of the Related Art

In petroleum and other drilling applications, in-situ stresses, reservoir pressure and rock mechanical properties are part of a basic geomechanical model (GM) that is used in drilling optimization, wellbore stability analysis, hydraulic fracturing design, reservoir performance prediction, optimal EOR design, optimal Enhanced Geothermal Systems, $CO_2$ injection, and subsurface $CO_2$ monitoring, and the like. Without good estimations of the subsurface state of stress, the results of any of these studies will have considerable uncertainties. Failure to construct reasonably accurate GMs can cost the oil and gas industry billions of dollars annually due to wellbore collapses, failure of fracturing operations, poor performance of reservoirs, cap-rock integrity issues, and inappropriate well placement and completions design. A reliable GM is also of paramount importance in carbon storage projects to optimize injection pressure and rate, estimate changes in the state of stress due to injection, predict reactivation of faults and fractures, evaluate the integrity of caprock, identify possible $CO_2$ leaks, interpretation of microseismic events etc.

Despite the development of advanced analytical and numerical modeling tools and the considerable amount of funding dedicated to R&D for the development of new methodologies to build 3D field-scale stress models, the importance of calibration of these models with direct measurements of field stresses has largely been ignored. In-situ stresses are notoriously hard to estimate and their estimation without calibration to reliable measurements can render misleading results. Currently, there is no technology available to directly measure all principal stress components in deep formations rather than estimating them from other highly uncertain measurements.

Usually, stress measurement procedures consist of perturbing an in-situ equilibrium state by inducing deformation and observing rock deformation. When the perturbation is an applied or induced deformation, stresses are back calculated from these deformations. Alternatively, small scale hydraulic fracturing is a common method for inferring the minimum in-situ principal stress. Total principal stresses are frequently aligned with the vertical stress ($S_v$), the minimum horizontal stress ($S_{hmin}$) and the maximum horizontal stress ($S_{Hmax}$) on the presumption of a relaxed basin and/or minimal tectonic history. $S_v$ can be calculated by integrating a density log over depth. $S_{hmin}$ is typically interpreted from the results of Extended Leak-off Test (XLOT), minifrac, or Diagnostic Fracture Injection Test (DFIT). However, for inferring $S_{Hmax}$, except for near-surface locations, no consistent and reliable measurement methods are available. While approximations or ranges of $S_{Hmax}$ can be made from evaluating breakouts and breakdown pressure, the reliability remains very poor. Since $S_{Hmax}$ has a major effect on all subsurface activities, a reliable measurement technique in deep wells remains a priority. The development of such a technique is expected to have a significant impact on the success of any subsurface activities, including $CO_2$ injection and monitoring.

Of all the developed methods for stress measurements (i.e., hydraulic fracturing, over-coring, under-coring, borehole slotting, borehole breakouts, jacking, and anelastic strain recovery), only hydraulic fracturing and borehole breakouts have been widely used for formations deeper than 2,000 ft. This is because the assumptions of linear elasticity, homogeneity and isotropy are not valid in the deep oil and gas, geothermal and carbon storage wells that involve high pressure and temperature. Although hydraulic fracturing provides a simple and consistent measurement of $S_{hmin}$, the unreliability of its estimate of $S_{Hmax}$ has been confirmed. Borehole geometry, injection rate, fluid viscosity, temperature, reopening of existing natural fractures and planes of weakness are factors that significantly affect the results of hydraulic fracturing. Moreover, hydraulic fracturing may be operationally difficult or sometimes impossible in ultra-deep formations due to pressure limitations of pumps, casing and wellheads.

Back calculation of $S_{Hmax}$ from borehole breakout geometry is widely used in the oil and gas industry; however, this protocol is based on a number of assumptions (e.g. elasticity, plane strain, isotropy, homogeneity etc.) that jeopardize its applicability in many rock types.

With respect to the state-of-the-art, few notable developments have been reported in the last decade. Exceptions include some attempts to improve or combine already existing methods, such as borehole deformation, core deformation, core disking, hydraulic fracturing and acoustic wave velocities. These attempts are largely derivative of scientific drilling projects that have the luxury of extensive and detailed data availability. However, this is usually not the case in actual, commercial operations.

Despite significant efforts applied to estimate in-situ stresses using geophysical methods (such as velocity processing), these calculations can be erroneous due to the application of oversimplified models of the in-situ geologic domain (e.g., uniaxial strain, supplementary differential tectonic stresses, etc.). A sonic scanner logging tool uses cross-dipole, multi-spaced monopole, and axial-azimuthal measurements. However, this tool has not become popular due to cost and lack of strong proof of concept. Hydraulic fracturing has been integrated with the deformation of core samples and developed a downhole tool for stress determination. This method employs what is called the deep rock stress tester (DRST). This technique requires a costly process of drilling a small diameter hole and taking oriented core while still suffering from unrealistic assumptions of rock behavior. One system employs a wireline system for hydraulic rock stress measurements. However, this method is essentially a combination of three existing techniques and still suffers from the disadvantages discussed above.

Therefore, there is a need for a single system and method for reliable determination of the complete state of in-situ stress of rock formations in borehole.

SUMMARY OF THE INVENTION

The disadvantages of the prior art are overcome by the present invention which, in one aspect, is a tool for measuring direct in-situ stress in rock surrounding a borehole that includes: a slot cutting system, a flat-jack stress measurement device, a hydraulic system, and a sensor. The slot cutting system cuts a slot having an original width in the rock surrounding the borehole. The flat-jack stress measurement device fits into the slot. The hydraulic system expands the flat-jack stress measurement device when it is in the slot to the original width of the slot. The sensor measures pressure in the hydraulic system when the flat-jack stress measurement device has expanded to the original width of the slot.

In another aspect, the invention is a method of measuring direct in-situ stress in rock surrounding a borehole. A first slot having an original width is cut into the rock at a selected depth. A flat-jack stress measurement device is placed into the slot. The flat-jack stress measurement device is expanded until the slot has returned to the original width. An amount of pressure applied to the flat-jack stress measurement device once the slot has returned to the original width is sensed. Stress in the rock calculated based on the amount of pressure.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
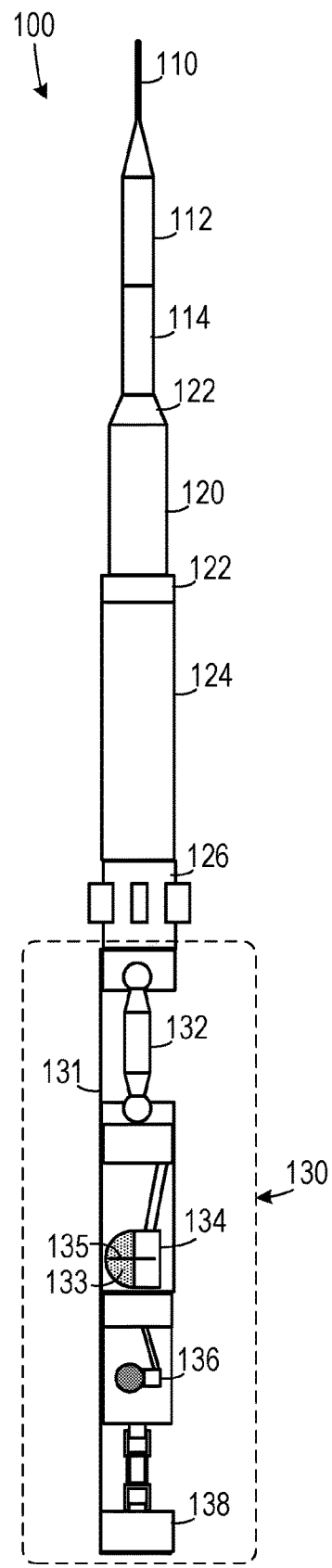
FIG. 1 is an elevational view schematic diagram of one embodiment of a wireline package for borehole rock sensing, including a tool for measuring direct in-situ stress in rock surrounding a borehole.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one representative embodiment of a wireline package 100 for borehole rock sensing includes a tool 130 for measuring direct in-situ stress in rock surrounding a borehole, a pad assembly 126 (such as a four arm pad assembly) that is configured to push the tool 130 against the wall of the borehole, a magnetometer 114 that is configured to provide information used to orient the tool 130, a gamma ray sensing assembly 112 to correlate the location of the tool 130 with well logs of previously-employed borehole sensing devices, a hydraulics system 124 for activating the tool 130, an electronics assembly 120 for control and communications, and a wireline 110 (such as a steel cable extending to the top of the borehole) for suspending and supporting the tool 130 from a wench (not shown) at the top of the borehole. Knuckle joints 122 can be placed at selected locations and used for articulating package 100.

The tool 130 for measuring direct in-situ stress includes a rotation control mechanism 132 that controls the radial direction of the tool 130. The rotation control mechanism 132 includes a rotation control motor 135 for effecting rotation and an arm 142. The tool 130 employs a flat-jack stress measurement device 134 (which includes a flat-jack 133), a slot cutting saw system 136 (which can include two parallel diamond rock cutting circular blades), a strain meter 135 to measure slot deformation (which can be a V-shaped strain gauge employing two strain-sensitive prongs and a strain sensor), and a vertical sliding subset 138. A stainless steel shield 131 covers and protects these devices while running in or tripping out of the borehole. All of these components are controlled from the surface.

The electronics assembly 120 contains all components that control the tool, record information, and communicate with surface. The hydraulics system 124 supplies fluid pressure to the flat-jack. The 4-arm pad 126 pushes the tool 130 toward the borehole wall when cutting and measuring. In one embodiment, it is like a 4-arm caliper, except that the arms open sequentially for full flexibility to push the tool 130 to any desired locations on the wellbore wall.

Figure 2A:
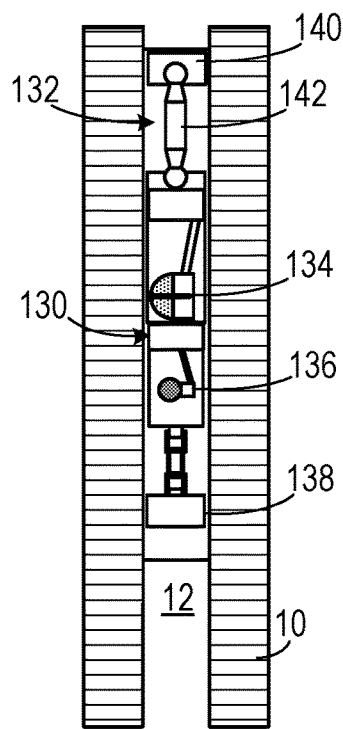
FIG. 2A is an elevational view schematic diagram of the tool for measuring direct in-situ stress in rock surrounding a borehole at a depth of interest.
Figure 2B:
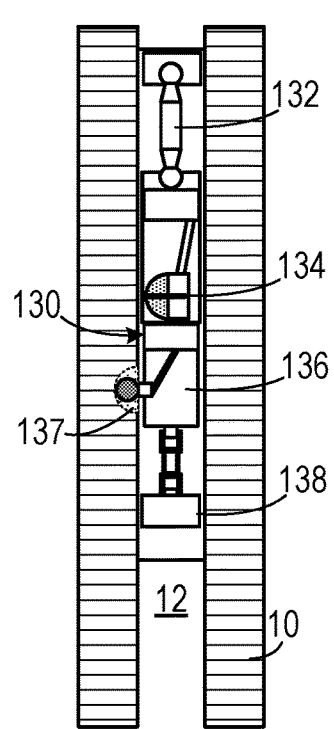
FIG. 2B is an elevational view schematic diagram of the tool demonstrating the cutting of a slot in the rock.
Figure 2C:
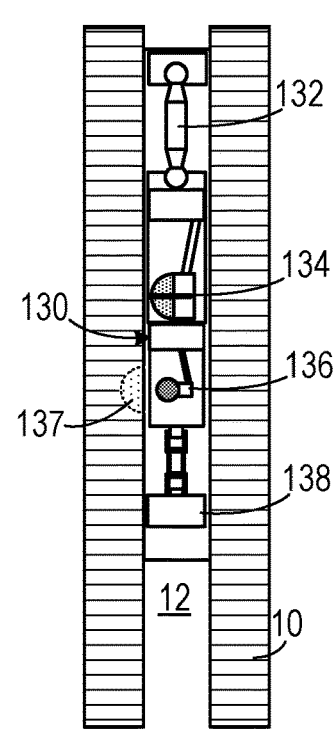
FIG. 2C is an elevational view schematic diagram of the tool in which the slot cutting system has been retracted, leaving the slot opening to the borehole.
Figure 2D:
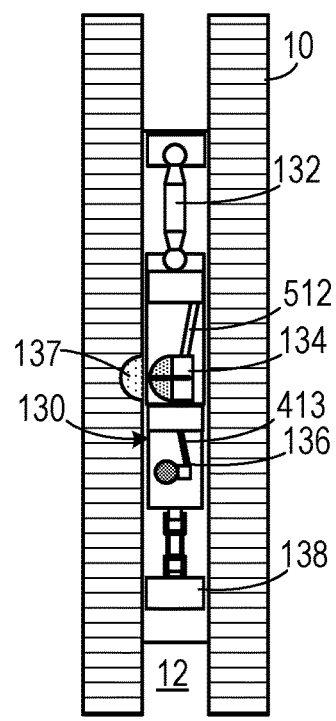
FIG. 2D is an elevational view schematic diagram of the tool in which the flat-jack stress measurement device has been lowered to the level of the slot.
Figure 2E:
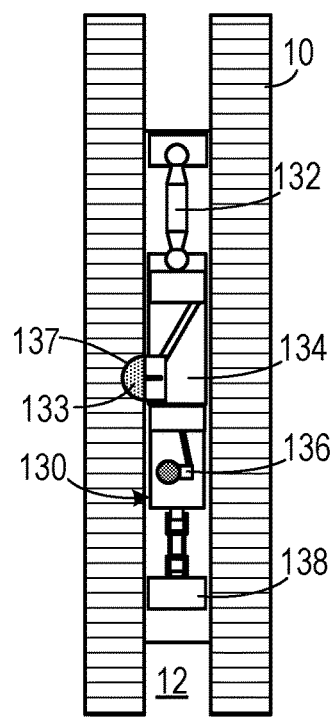
FIG. 2E is an elevational view schematic diagram of the tool in which the flat-jack stress measurement device is placed in the slot.

As shown in FIG. 2A, the tool 130 is moved to the target depth at a desired orientation in the borehole 12. As show in FIG. 2B, the slot cutting saw system 136 cuts a slot 137 into the rock 10 surrounding the borehole 12. As shown in FIG. 2C, the sawing system 136 is removed from the slot 137 and, as shown in FIG. 2D, the tool 130 is moved in the borehole 12 until the flat-jack 133 is aligned vertically and horizontally with the slot 137. Once cut, the slot 137 typically narrows due to static pressure. As shown in FIG. 2E, the flat jack 133 is placed in the slot 137 while in a deflated state and is filled with hydraulic fluid until the slot 137 is expanded to its original width, at which time the pressure of the hydraulic fluid is measured. The local stress in the rock is proportional to the pressure of the hydraulic fluid needed to restore the slot 137 to its original width. This process can be repeated at a given depth to measure stress in different radial locations by rotating the tool 130. In one embodiment, the operation time for each slot cutting and stress measurement is estimated to be 5-10 minutes depending on the hardness of the rock formation.

Figure 4:
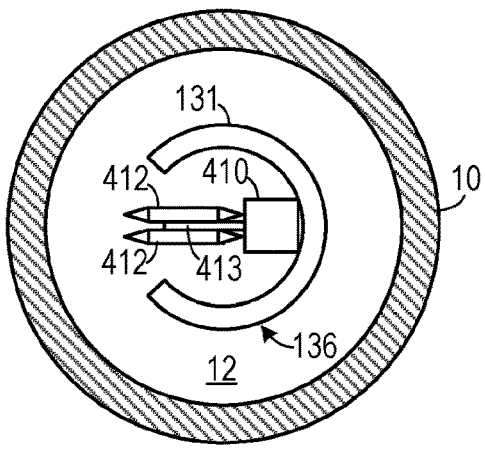
FIG. 4 is a top plan view schematic diagram of slot cutting system
Figure 5A:
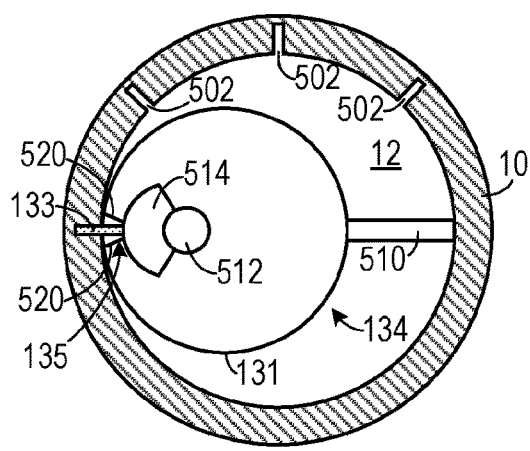
FIG. 5A is a top plan view schematic diagram of the flat-jack stress measurement device engaging rock surrounding the borehole.
Figure 5B:
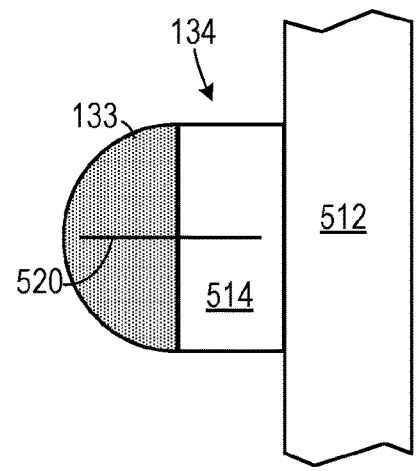
FIG. 5B is an elevational view schematic diagram of a detail of the flat-jack stress measurement device.

As show in FIG. 4, the sawing system 136 includes a robotically-controlled hydraulic/electric motor gear box 410 that is coupled to two parallel circular diamond saw blades 412 that are coupled to the gear box 410 by a retractable arm 413. As shown in FIGS. 5A and 5B, the flat-jack stress measurement device 134 includes a robotic control arm 512 for positioning the flat-jack 133 employing a horizontal control motor. A pressure cell 514 applies pressure to the flat-jack 133 and senses the pressure applied. Two prongs 520 form the rock contact-points of the V-shaped strain meter 135. A back-up arm 510 drives the system to the face of the rock 10. Also shown is a plurality of different slots 502 having different radial orientations that were cut by the sawing system 136.

Figure 6A:
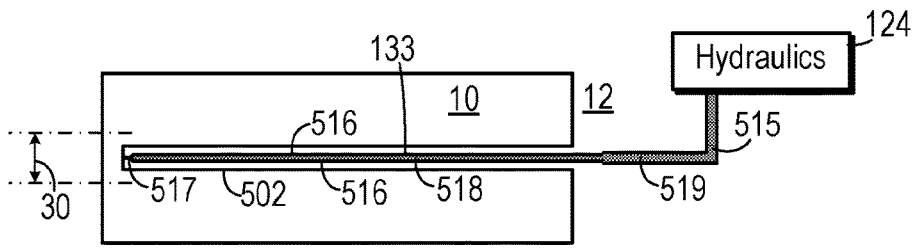
FIG. 6A is a schematic diagram showing the flat-jack stress measurement device in a deflated state.
Figure 6B:
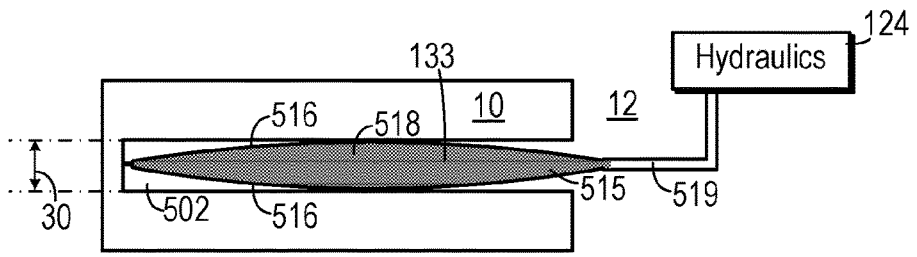
FIG. 6B is a schematic diagram showing the flat-jack stress measurement device in an inflated state.

The flat-jack stress measurement device 134, as shown in FIG. 6A, includes two metal sheets 416 that each having a periphery 517 and that are welded together about their periphery 517 so as to define a void 518 therebetween. The void 518 opens to a tube 519 that is in fluid communication with the hydraulic system 124. The slot 502 in its compressed state is shown in FIG. 6A, whereas once hydraulic fluid 515 is pumped into the slot 502, as shown in FIG. 6B, the flat-jack 133 forces the slot 502 to return to its original as-cut width 30. The borehole rock sensing includes a tool 130 can be used to measure stress in a plurality of different depths and in a plurality of different radial directions for any given dept.

In one experimental embodiment, the tool 130 was designed for wells with an 8½" to 12¼" diameter, up to 20,000 psi pressure and up to 350° F. temperature. The tool 130 can slide up and down in the borehole and rotate to make measurements in different depths and orientations. In one embodiment, the electronics and hydraulic control systems are of the type used in typical downhole tolls such as the Rotary Core, the Reservoir Characterization Tool, etc.

These mechanisms slide axially and rotate to enable cutting and measuring at any desired depth and orientation on the wellbore wall. The slot cutting saw system and the flat-jack system move and rotate together for ease of operation.

In the experimental embodiment, a Circular Diamond Blade Saw (CDBS) with 3.5" blade diameter was found to be the most practical method. The CDBS is powered by a hydraulic motor. A robotic arm and horizontal control motor move the saw toward the formation while rotating as well. These simultaneous rotation and horizontal movement create a semicircular slot of 3.5" radius, enough to appropriately measure the stress normal to the slot. The CDBS blades cut a slot width which will be designed to be slightly thicker than the flat-jack in uninflated state. The circular movement is controlled by a chain/axis attached to the hydraulic system. CDBS has twin saw blade teeth to make a smooth slot suitable for flat-jack installation.

The Flat-jack system measures the stress normal to the slot plane. It includes the flat-jack itself, a hydraulic hose or tube for fluid injection, a pressure cell to apply pressure, a transducer to measure pressure, a V-shape strain meter to measure the slot deformation and a robotic control arm to install the flat-jack inside the slot and retrieve it.

The system is automatically operated from surface. The exact position and orientation of the tool is determined by the gamma ray sensor assembly and the magnetometer. In one embodiment, the operation starts at a selected depth and orientation through command from a surface logging truck and continues with below procedure:

1. One of the arms of the 4-arm pad pushes the whole assembly including the saw and flat-jack systems toward the borehole wall at the selected location and orientation.
2. The slot cutting saw system starts the cutting process and creates the first slot by slowly moving the blades against the borehole wall while rotating upwards and downwards. Then the CDBS is removed and the whole measurement sub moves down by the sliding subset to locate the flat-jack in front of the slot. The vertical travelling distance is precisely controlled by the Vertical Control Motor.
3. The flat-jack is pushed inside the slot by the horizontal hydraulic motor and the arm/piston. The arm travelling distance is measured to confirm the flat jack placement inside the slot.
4. When the flat-jack is inside the slot, the V-shape strain meter is automatically installed on the borehole wall to accuracy measure the slot closure (displacement) due to stress release.
5. The flat-jack is then inflated to compensate for the stress release and return the slot deformation to the initial condition. This compensation pressure is equal to the stress normal to the flat-jack surface.
6. After measurement, flat-jack is deflated and retrieved inside the metal shield. The whole assembly is centralized again.
7. The whole assembly is then rotated at a desired angle by the rotation control mechanism.
8. Steps 1 to 6 are repeated to acquire a new stress measurement.
9. This process will be repeated, in one embodiment, for six times in different orientations (most general case).
10. Data are sent to the surface, either in real-time or on memory, for stress calculation.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A tool for measuring direct in-situ stress in rock surrounding a borehole, comprising:
   (a) a wireline; and
   (b) a wireline package hanging from the wireline, the wireline package containing:
      (i) a flat slot cutting system that cuts a flat slot having an original width in the rock surrounding the borehole;
      (ii) a flat-jack stress measurement device that is vertically displaced from the flat slot cutting system in the wireline package and that fits into the slot;
      (iii) a hydraulic system that expands the flat-jack stress measurement device when it is in the slot to the original width of the slot; and
      (iv) a sensor that measures pressure in the hydraulic system when the flat-jack stress measurement device has expanded to the original width of the slot.

2. The tool of claim 1, further comprising a strain gauge disposed in the wireline package and applied to the rock on opposite sides of the slot.

3. The tool of claim 2, wherein the strain gauge comprises:
   (a) two prongs extending from the flat-jack stress measurement device that form a V shape, wherein each prong contacts the rock on a different side of the slot; and
   (b) a strain sensor that senses force applied by the rock on the two prongs.

4. The tool of claim 1, further comprising a rotation control motor disposed in the wireline package that directs the slot cutting system and the flat-jack stress measurement device to at least one predetermined radial direction in the borehole.

5. The tool of claim 1, further comprising a suspension mechanism for lowering the wireline package into the borehole to a desired depth.

6. The tool of claim 5, wherein the slot cutting system and the flat-jack stress measurement device are in vertical alignment with each other within the wireline package and wherein the suspension mechanism comprises
   (a)
   (b) a winch for raising and lowering the wireline into the borehole.

7. The tool of claim 6, wherein the hydraulic system is supported by the wireline and vertically aligned with the slot cutting system and the flat-jack stress measurement device.

8. The tool of claim 6, further comprising a magnetometer assembly that is included in the wireline package.

9. The tool of claim 6, further comprising a gamma ray measurement assembly that is included in the wireline package.

10. The tool of claim 1, wherein the slot cutting system comprises:
    (a) a saw; and
    (b) a robotically-controlled device that drives the saw into the rock.

11. The tool of claim 10, wherein the saw comprises:
    (a) two parallel circular saw blades; and
    (b) a motor that rotates the saw blades.

12. The tool of claim 11, wherein the saw blades comprise diamond saw blades.

13. The tool of claim 10, wherein the robotically-controlled device comprises:
    (a) a horizontal control motor; and
    (b) an arm extending therefrom that is driven laterally by the horizontal control motor and that is coupled to the saw.

14. The tool of claim 1, wherein the flat-jack stress measurement device comprises two metal sheets, each having a periphery, that are welded together about their periphery so as to define a void therebetween, the void opening to a tube that is in fluid communication with the hydraulic system.

15. The tool of claim 14, wherein the flat-jack stress measurement device further comprises:
    (a) a horizontal control motor; and
    (b) an arm extending therefrom that is driven laterally by the horizontal control motor and that is coupled to the flat-jack stress measurement device.

16. A method of measuring direct in-situ stress in rock surrounding a borehole, comprising the steps of:
    (a) lowering a wireline package into the borehole, in which the wireline package includes a slot cutting system and a flat-jack stress measurement device;
    (b) cutting a first flat slot having an original width into the rock at a selected depth with the slot cutting system;
    (c) moving the wireline package vertically until the flat-jack stress measurement device is aligned with the first slot and placing the flat-jack stress measurement device into the first flat slot;
    (d) expanding the flat-jack stress measurement device until the first flat slot has returned to the original width;
    (e) sensing an amount of pressure applied to the flat-jack stress measurement device once the first flat slot has returned to the original width; and
    (f) calculating stress in the rock based on the amount of pressure.

17. The method of claim 16, further comprising the step of cutting at least one second slot having the original width into the rock at the selected depth is a radial direction that is different from a radial direction of the first flat slot and measuring direct in-situ stress in the rock in the second slot.

18. The method of claim 16, further comprising the step of measuring direct in-situ stress in the rock at a plurality of different depths in the borehole.

19. The method of claim 16, further comprising the step of sensing strain in the rock between opposite sides of the slot.

20. The method of claim 16, wherein the step of cutting a first slot is done with a sawing device, and wherein the flat-jack stress measurement device is vertically aligned with the sawing device, and wherein the sawing device and the flat-jack stress measurement device are both suspended by a winch-controlled vertical support cable, and further comprising the steps of:
    (a) activating the winch to vertically move the sawing device until the sawing device is at the selected depth;
    (b) activating the sawing device and driving it into the rock until the slot is cut while the sawing device is at the selected depth;
    (c) retracting the sawing device from the slot;
    (d) activating the winch to vertically move the flat-jack stress measurement device until the flat-jack stress measurement device is aligned with the slot; and
    (e) activating a robotic mechanism that laterally moves the flat-jack stress measurement device into the slot.

21. The method of claim 16, wherein the step of expanding the flat-jack stress measurement device comprises pumping a hydraulic fluid into the flat-jack stress measurement device and wherein the step of sensing an amount of pressure applied to the flat-jack stress measurement device comprises sensing an amount of pressure in the hydraulic fluid.

\* \* \* \* \*